(12) United States Patent
Gurin

(10) Patent No.: US 7,195,721 B2
(45) Date of Patent: Mar. 27, 2007

(54) QUANTUM LILYPADS AND AMPLIFIERS AND METHODS OF USE

(76) Inventor: Michael H. Gurin, 4132 Cove La., Suite A, Glenview, IL (US) 60025

( * ) Notice: Subject to any disclaimer, the term of this patent is extended or adjusted under 35 U.S.C. 154(b) by 354 days.

(21) Appl. No.: 10/642,560

(22) Filed: Aug. 18, 2003

(65) Prior Publication Data

US 2005/0040370 A1    Feb. 24, 2005

(51) Int. Cl.
*C04B 35/00*     (2006.01)
*H01L 29/06*    (2006.01)
*H01L 35/28*    (2006.01)

(52) U.S. Cl. ............... 252/500; 428/402; 428/403; 428/404; 428/405; 428/407; 977/777; 977/785; 977/786; 136/203; 136/205; 136/206; 136/243; 136/250; 136/291; 429/33; 429/111

(58) Field of Classification Search ........... 252/500, 252/502, 511, 514, 582; 428/357, 402, 403, 428/404, 407; 977/DIG. 1, 773, 785, 786; 257/9, 10, 21, 43, 451; 136/203, 205, 206, 136/243; 359/296; 250/200; 429/33, 111
See application file for complete search history.

(56) References Cited

U.S. PATENT DOCUMENTS

| | | | | |
|---|---|---|---|---|
| 3,345,187 A | * | 10/1967 | Binnis | 106/14.37 |
| 3,862,071 A | * | 1/1975 | Di Carlo | 524/437 |
| 3,950,193 A | * | 4/1976 | Caule | 428/332 |
| 4,888,135 A | * | 12/1989 | Tsunaga et al. | 252/512 |
| 5,294,374 A | * | 3/1994 | Martinez et al. | 252/516 |
| 5,578,238 A | * | 11/1996 | Weiss et al. | 252/62.52 |
| 5,976,419 A | * | 11/1999 | Hawkins et al. | 252/512 |
| 6,211,274 B1 | * | 4/2001 | Tanegashima et al. | 524/399 |
| 6,323,989 B1 | * | 11/2001 | Jacobson et al. | 359/296 |
| 6,777,706 B1 | * | 8/2004 | Tessler et al. | 257/17 |

FOREIGN PATENT DOCUMENTS

| JP | 58-101168 | * | 6/1983 |
|---|---|---|---|
| JP | 58-103565 | * | 6/1983 |
| WO | WO 00/04593 | * | 1/2000 |

OTHER PUBLICATIONS

Data Sheet for AL-120, Micron Metals, 2006, 1-Pg.*

* cited by examiner

*Primary Examiner*—Mark Kopec
*Assistant Examiner*—Kallambella Vijayakumar

(57) ABSTRACT

A nanocomposite having enhanced energy conversion between thermal, electron, phonons, and photons energy states. The composition comprises a synergistic blend of nanoscale powders wherein the powders have nanoscale layered surface modifiers and a conductive medium. The powders and conductive medium are optionally altered through non-thermal modifiers and made into energy conversion devices.

13 Claims, No Drawings

QUANTUM LILYPADS AND AMPLIFIERS AND METHODS OF USE

BACKGROUND OF THE INVENTION

The present invention relates to compositions and methods for enhancing the quantum energy conversion and increasing the effective mean free path within a carrier medium.

Numerous devices depend on the conversion of energy from one form, such as thermal energy, to another form, such as electrical energy. The category of devices include, though not limited to, photoelectric, thermionic, thermoelectric, piezoelectric and electroluminescence. Common names for such devices include, though not limited to, fuel cells, photovoltaic cells, batteries, fluorescent lamps, and antennas.

Electrical conductivity compositions are utilized in a wide range of applications including, though not limited to: conductive inks, circuit boards, paints, electromagnetic and radio frequency interference protective coatings, and antennas. Electrical conductivity compositions include a wide range of solids and liquids. For example, conductive polymers doped with metallic fillings. Electrically conductive media provide electron pathways between an electrical source and sink, respectively cathode and anode, to transfer electrical energy.

A variety of materials can be used where (electron, photon, or phonon) flow is to be maximized and resistance is minimized. Such media can benefit from cost effective methods to maintain quantum energy levels by maximizing tunneling through the utilization of nanoscale layers.

The present invention provides a new and improved energy conversion composition comprised of nanoscale additives having surface modified coatings and their method of use.

SUMMARY OF THE INVENTION

The term "nanoscale", as used herein, are particles having a mean average diameter of less than 1 micron meter and more particularly having a mean average diameter of less than 100 nanometers.

The term "mean free path length, is the distance of travel between collisions.

The term "functionalized", as used hererin, refers to means as known in the art including whereby compounds are emulsified to control of hydrophobic, hydrophilic or molecular polarity, or chemically bonded (including hydrogen bonding), and adsorbed.

The term "microetching" process combines the advantage of a controlled and locally enhanced (i.e. grain boundary) etch attack with those benefits of peroxide etching solutions (i.e. high metal load, constant etch rate, absence of byproducts). At very low etch rates the new process simultaneously creates an optimal "macro- and micro-structure" on the metal surface with dendritic features, therefore providing the increased surface area and reduced interfacial tension.

The term "quantum dots", as herein referred, have zero-dimensional confinement and represent the ultimate in reduced dimensionality, i.e. zero dimensionality. The energy of an electron confined in a small volume by a potential barrier as in a quantum dot, hereinafter referred to as "QD" is strongly quantized, i.e., the energy spectrum is discrete. For QDs, the conduction band offset and/or strain between the QD and the surrounding material act as the confining potential. The quantization of energy, or alternatively, the reduction of the dimensionality is directly reflected in the dependence of the density of states on energy.

As used herein, the term "flow path" is used to imply the flow of electrons, phonons, or photons (i.e., electron transfer from a cathode to anode).

The inventive nanocomposite has quantum energy conversion and increased effective mean free path within a carrier medium. Said powders have an average particle size of from about 1 nanometer to about 1 micron and a nanoscale surface modification.

In accordance with one aspect of the present invention, an enhanced nanocomposite is comprised of a powder having a surface modified nanoscale layer wherein the powder has an average particle size of from about 1 nanometer to about 1 micron, and a nanoscale layer having an average thickness of from about 1 nanometer to about 100 nanometers within a conductive medium.

In accordance with one aspect of the present invention, the nanocomposite is made into a series of alternating nanocomposite matrix layers wherein the matrixes are subjected to a phonon or electron bias as induced by externally generated fields.

Yet another aspect of the present invention, a non-thermal means such as electron beam emitter is utilized to chemically alter the powders, and/or carrier medium. The synthesis of conductive polymers, nanotubes, nanohorns, and fullerenes is also concurrently produced.

In accordance with yet another aspect of the present invention, products are made from the nanocomposite matrixes to achieve energy conversion including thermionics, thermoelectric, photovoltaic, fuel cell, piezoelectrics, photoelectrics, ballistic tunneling, and thermal diodes devices; and photon, electron, and photon emitters.

Without being bound by theory, it is believed that nanocomposites of this invention have increased mean free path by incorporating the surface modified particles with nanoscale layers.

Without being bound by theory, it is believed that in nanocomposites of this invention the path direction is influenced and controlled by the externally generated fields.

Additional features and advantages of the present invention are described in and will be apparent from the detailed description of the presently preferred embodiments. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

DETAILED DESCRIPTION OF THE PREFERRED EMBODIMENTS

The inventive nanocomposite is now set forth as a composite comprising a powder having a surface modified nanoscale layer.

Without being bound by theory, it is believed that nanocomposites of this invention are powders having surface modified layer, wherein the layer is in the nanoscale regime, have quantum particles such as phonons that are effectively reflected rather than colliding with minimal momentum transfer. This effectively increases the mean free path length that is an important parameter for energy transfer. The powders are preferably made of materials selected from the group consisting of metals, metal oxides, organometallics, semiconductors, alloys, carbon products, and combinations thereof. The powders preferably have an average particle size from about 1 nanometer to about 1 micron. The powders preferably are surface treated with a nanoscale layer having an average thickness of from about 1 nanometer to about 100 nanometers. The nanoscale layer is more preferred when the layer is approximately a monolayer or multilayer. The nanoscale is specifically preferred when the layer is a monolayer not exceeding 100 nanometers in thickness. The nanoscale is particularly preferred when the layer is a monolayer not exceeding 20 nanometers in thickness. More particularly specific is a monolayer not exceeding 5 nanometers in thickness.

The surface modified powders are dispersed evenly into a conductive medium. Without being bound by theory, it is believed that the conductive medium reduces the effective energy transfer resistance. The conductive medium is preferably selected from the group of monomers, polymers, organometallics, and combinations thereof. The conductive medium is more preferred to have the monomers polymerized into a conductive polymer, whereby the powders are more easily dispersed in the monomers or low viscosity/melt temperature polymers. Specifically preferred is a conductive medium wherein the medium is a nanocomposite having an average particle size of from about 1 nanometer to about 1 micron. Particularly preferred is a conductive medium that is functionalized with a nanoscale layer having an average thickness of from about 1 nanometer to about 100 nanometers.

The conductive nanocomposite is assembled into a nanocomposite matrix that includes a method to subject an externally generated field that induces a directional bias of energy transfer including phonon or electron bias. The conductive nanocomposite preferably utilizes fields selected from the group of ultrasonic, acoustic phonon, magnetic, electromagnetic, and electrical fields. The fields are generated by devices including ultrasonic transducers, piezoelectric films or transducers, acoustic phonon emitters, electron beam emitters, and magnetic, electromagnetic, and electrical field generators.

The above nanocomposite, hereinafter referred to as conductive nanocomposite is assembled into a nanocomposite matrix. The matrix optionally consists of multiple layers of conductive nanocomposite. The matrix is further optionally comprised of alternating layers of nanocomposite doped with conductive additives, and nanocomposite doped with semiconductor additives. The alternating layers preferably have layer thickness less than 100 nanometers. More specifically preferred is layer thickness less than 10 nanometers.

The functionalized powders having a surface modified nanoscale layer within the conductive nanocomposite are optionally further functionalized for at least one purpose selected from the group promoting dispersion, enhancing corrosion resistance, reducing friction, enhancing chemical stability, enhancing molecular polarity, modifying hydrophobic or hydrophilic characteristics, enhancing solubility, providing stability against thermal and ultraviolet degradation, enhancing lubricity, improving mold release, varying color, incorporating nucleating agents, enhancing plasticity, or enhancing means to make emulsions.

The conductive medium are also optionally functionalized for at least one purpose selected from the group promoting dispersion, enhancing corrosion resistance, reducing friction, enhancing chemical stability, enhancing molecular polarity, modifying hydrophobic or hydrophilic characteristics, enhancing solubility, providing stability against thermal and ultraviolet degradation, enhancing lubricity, improving mold release, varying color, incorporating nucleating agents, enhancing plasticity, or enhancing means to make emulsions.

The nanocomposite is also optionally further comprised of surfactant wherein the interfacial tension of the powders is reduced. The nanocomposite is also optionally further comprised of quantum. The surface modified powders are optionally further subjected to microetching process wherein the surface topography is modified with nanoscale dendritic features.

The conductive nanocomposite, comprised of carbon products, monomers, polymers, organometallics, metals, metal oxides, and semiconductors, are optionally chemically modified by non-thermal methods. The non-thermal methods, without being bound by theory, have the advantage of inducing a series of chemical reactions including reductions, polymerizations, and oxidation reactions at faster rates, higher densities, and superior control. The non-thermal methods are preferably selected from the group of microwave and electron beam. More preferred is the utilization of additional methods known in the art to control beam direction, and selective beam penetration into the conductive nanocomposite. The non-thermal method of achieving chemical modification is preferably subjected to a phonon or electron bias as induced by externally generated fields as referenced above. Without being bound to theory, the externally generated field creates a preferential alignment within the conductive nanocomposite prior to chemical modification. The non-thermal chemical modification method furthers provides the benefit of absence of thermal agitation within the nanocomposite, thus maintaining the preferential alignment.

A wide range of products are made from the above resulting nanocomposite matrixes. These products are optionally and more preferably further subjected to a phonon or electron bias as induced by externally generated fields. The externally generated fields are preferably selected from the group of ultrasonic, acoustic phonon, magnetic, electromagnetic, and electrical fields. The externally generated fields have the ability to produce byproducts selected from the group of conductive polymers, nanotubes, nanohorns, and fullerenes. The synthesis of nanotubes, nanohorns, and fullerenes are typically produced from carbon products. Nanotubes can be produced from a series of metals, organometallics, semiconductor materials, and combinations thereof. The derived products are optionally and preferably utilized as energy conversion products selected from the group of thermionics, thermoelectric, photovoltaic, fuel cell, piezoelectrics, photoelectrics, ballistic tunneling, thermal diodes; and photon, electron, and photon emitters.

Without intending to limit the scope of the invention, the following examples describe methods of forming and using conductive nanocomposite of the present invention.

EXAMPLES

Example 1 a) Copper nanoparticles of 25 nm are complexed with tolytriazole.
b) Complexed copper of above is dispersed into a precursor polyparaphenylene-vinylene.
c) The above nanocomposite is cast into a thin film of less than 100 nanometers.
d) The above nanocomposite is polymerized by non-thermal curing using an electron beam emitter.

Example 2 a) Alumina nanoparticles of 25 nm are complexed with tolytriazole.
b) Complexed alumina of above is dispersed into a precursor polyparaphenylene-vinylene.
c) The above nanocomposite is cast onto the nanocomposite matrix film of Example 1. The excess non-cured precursor material is removed by methods known in the art.

d) The above nanocomposite is polymerized by non-thermal curing using an electron beam emitter.
e) The resulting nanocomposite multilayer film is utilized as a photoelectric generator.

Example 3 a) Copper nanoparticles of 25 nm are complexed with tolytriazole.
b) Complexed copper of above is dispersed into a precursor polyparaphenylene-vinylene.
c) The resulting blend of above, known as conductive monomer is placed onto the nanocomposite matrix film of Example 1 such that a layer of 1 micron is achieved.
d) The above nanocomposite is polymerized by non-thermal curing using an electron beam emitter and a screen to create polymerized microchannels having a depth of 1 micron.
e) Melted sacrificial material made from wax is placed on the above nanocomposite matrix film microchannel to completely fill 99% of the microchannel voids. Excess material is removed.
f) The steps c through e are repeated four times to achieve a multilayer thermionic device.

Example 4

Example 3 plus a layer of piezoelectric film is placed between the sacrificial wax and the conductive monomer.

Example 5

Example 3 plus a layer of non-conductive (i.e., insulator) is placed between the sacrificial wax and the conductive monomer. The conductive layers will introduce a voltage bias to accelerate and bias the flow of phonons and electrons from the hot side to the cold side, and minimize the return of cold electrons into the hot side.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. An enhanced nanocomposite comprising a powder having a surface modified nanoscale layer selected from the group consisting of metals, metal oxides, organometallics, semiconductors, alloys, carbon products, or combinations thereof, the powder having an average particle size from about 1 nanometer to 100 nanometers, a nanoscale layer having an average thickness from 1 nanometer to 100 nanometers, and a nanocomposite conductive medium having an average particle size from 1 nanometer to 100 nanometers selected from the group consisting of monomers, polymers, organometallics, and combinations thereof, wherein the enhanced nanocomposite is assembled into a matrix comprised of at least one series of an alternating layer of nanocomposite doped with conductive additives with a layer of nanocomposite doped with semiconductor additives and wherein the thickness of a layer of nanocomposite doped with conductive additives is less than 10 nanometers and the thickness of a layer of nanocomposite doped with semiconductor additives is less than 10 nanometers.

2. The enhanced nanocomposite according to claim 1, wherein the carbon products, monomers, polymers, organometallics, metals, metal oxides, and semiconductors are chemically modified by non-thermal means.

3. The enhanced nanocomposite according to claim 2, wherein the non-thermal means is selected from the group consisting of microwave or electron beam.

4. The enhanced nanocomposite according to claim 2, wherein the non-thermal means is further subjected to a phonon or electron bias as induced by externally generated fields.

5. The enhanced nanocomposite according to claim 4, wherein the externally generated fields is selected from the group consisting of ultrasonic, acoustic phonon, magnetic, electromagnetic, or electrical fields.

6. The enhanced nanocomposite according to claim 1, wherein the enhanced nanocomposite is utilized within energy conversion products including products selected from the group consisting of thermionics, thermoelectric, photovoltaic, fuel cell, piezoelectrics, photoelectrics, ballistic tunneling, thermal diodes; and photon, electron, or phonon emitters.

7. The enhanced nanocomposite according to claim 6, wherein the enhanced nanocomposite is further subjected to a phonon or electron bias as induced by externally generated fields.

8. The enhanced nanocomposite according to claim 7, wherein the externally generated field is selected from the group consisting of ultrasonic, acoustic phonon, magnetic, electromagnetic, or electrical fields.

9. The enhanced nanocomposite according to claim 8, wherein the application of externally generated fields produces byproducts including byproducts selected from the group consisting of conductive polymers, nanotubes, nanohorns, fullerenes, or combinations thereof.

10. The enhanced nanocomposite according to claim 1, wherein the multiple layer nanocomposite is subjected to a phonon or electron bias as induced by externally generated fields.

11. The enhanced nanocomposite according to claim 10, wherein at least one externally generated field is selected from the group consisting of ultrasonic, acoustic phonon, magnetic, electromagnetic, and electrical fields.

12. An enhanced nanocomposite assembled into matrix comprised of at least one series of an alternating layer of nanocomposite doped with conductive additives with a layer of nanocomposite doped with semiconductor additives comprised of a powder having a surface modified nanoscale layer selected from the group consisting of metals, metal oxides, organometallics, semiconductors, alloys, carbon products, or combinations thereof, the powder having an average particle size of from about 1 nanometer to about 1 micron, a nanoscale layer having an average thickness from 1 nanometer to 100 nanometers; and a nanocomposite conductive medium having an average particle size from 1 to 100 nanometers wherein the thickness of a layer of nanocomposite doped with conductive additives is less than 10 nanometers and the thickness of a layer of nanocomposite doped with semiconductor additives is less than 10 nanometers.

13. The enhanced nanocomposite assembled into matrix according to claim 12, wherein the nanocomposite is subjected to a phonon or electron bias as induced by externally generated fields.

* * * * *